Dec. 25, 1956   R. C. BARKER   2,775,060
FISHHOOK GUARD
Filed June 15, 1954

Raymond C. Barker
INVENTOR.

BY *Clarence A. O'Brien*
*and Harvey B. Jacobson*
Attorneys

United States Patent Office 2,775,060
Patented Dec. 25, 1956

2,775,060

FISHHOOK GUARD

Raymond C. Barker, Monmouth, Oreg.

Application June 15, 1954, Serial No. 436,791

3 Claims. (Cl. 43—57.5)

This invention relates to a safety-type fish hook guard and particularly to a device to be frictionally applied to a fish hook, particularly a gang hook, to prevent contact with the barbed bill portion of the hook while being carried on the person or in a fishing kit, or the like.

Fishermen frequently carry fish hooks about with them so that the hooks may be changed or so that hooks may be utilized as desired and for this purpose various types of kits have been devised so that the hooks will not become entangled with each other or with other gear or so that the hooks will not be caught in a person or the fisherman. It frequently happens, however, that the kits or containers for such devices are too cumbersome to be taken at all points and consequently considerable difficulty has been heretofore encountered in handling or carrying fish hooks without the fish hooks doing damage to a person or the fisherman.

In the construction according to this invention a rubber-like guard device is made which will slide onto the hooks, particularly gang hooks and be retained thereon by a frictional engagement therewith but which may be readily removed so that the hooks may be used.

Other objects and many of the attendant advantages of the present invention will be apparent from the following detailed description taken in conjunction with the accompanying drawing in which.

Figure 1:
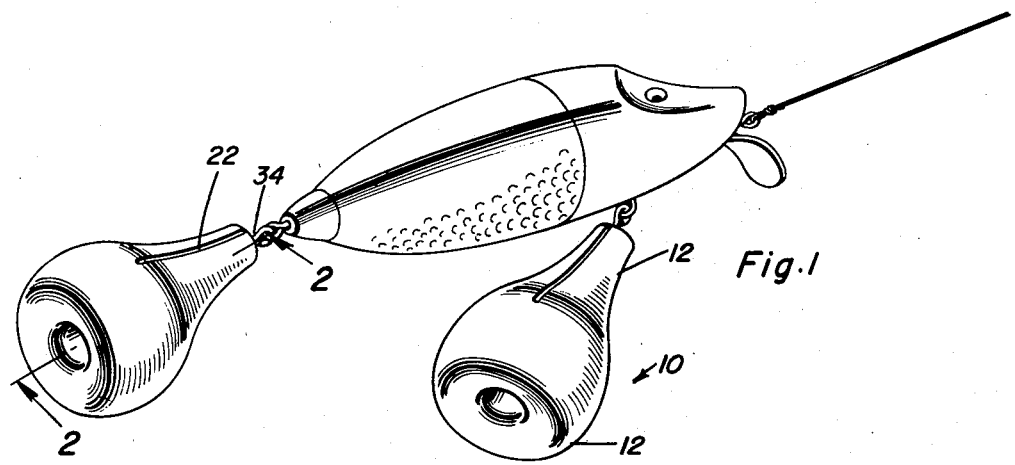
Figure 1 is a perspective view of a fish lure with a pair of guard-equipped fish hooks attached thereto.
Figure 3:
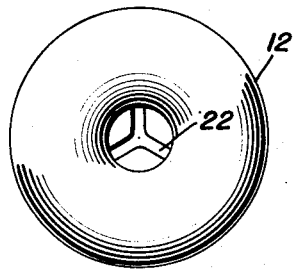
Figure 3 is a bottom end view of the fish hook guard according to the invention.
Figure 2:
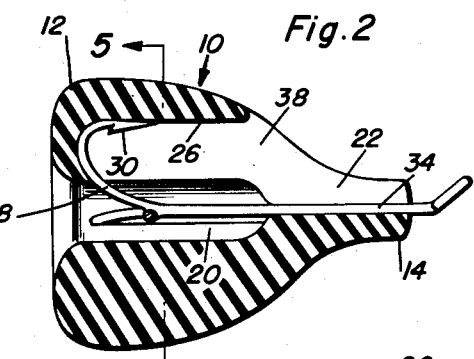
Figure 2 is a longitudinal sectional elevation through a fish hook guard showing a treble hook imposed therein.
Figure 4:
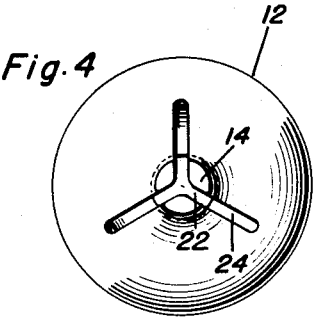
Figure 4 is a top or small end view of the guard.
Figure 5:
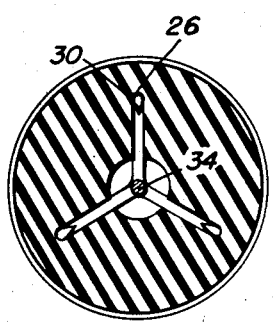
Figure 5 is a cross section through the guard taken substantially on the plane indicated by the section line 5—5 of Figure 2 and further showing the construction and operation of the device.

In the exemplary embodiment according to the invention the guard comprises a pear-shaped or bulbous-like body 10 constructed of suitable material preferably of a rubber-like consistency. The body 10 is provided with a large end 12 and a reduced neck-forming end 14 with the body tapering from the end 12 to the reduced end 14 by a reverse curve. The large end 12 of the device is preferably substantially rounded and has an axial concavity communicating with an axial bore 20 as will presently be described.

The reduced end or neck 14 is provided with radially divergent slots 22 herein indicated as three in number to receive a treble hook, however, any desired number of slots 22 may be provided. The slots 22 communicate with each other adjacent the axis of the body 10 and a lateral edge 24 of the slots 22 communicates with the lateral surface of the body 10 throughout the majority of the reduced portion of the device but is provided with a wall 26 adjacent the larger end of the device so that a hook 28 may be readily slid therein and the barb 30 completely concealed within the construction. When a treble or other multiple hook is used the shank 34 will be substantially in the axis of the device. The slots 22 are of sufficient width that the hook portions slide readily therein but have friction engagement with the sides of the slots so that they do not freely fall therefrom but must be forcibly withdrawn. The friction should be sufficiently strong that the weight of the device will not cause the separation from the hooks but sufficiently gentle that the hooks may be removed from the guards without the creation of a jerking motion which might cause the injury of the fisherman. In order to properly control the amount of friction applied to the fish hooks 28 a counter-bore 20 will be of a desired size to provide the desired friction area between the walls 38 of the slot 22 and the fish hook 28 to properly proportion the pull to the holding strength thereof.

In the operation of the construction according to the invention, the rubber-like bodies 10 will be applied to the various hooks of a fisherman's kit so that it may be retained in the kit itself or even carried in the pocket of the fisherman without any danger of his being injured by contact with the barbs of the hooks.

For the purpose of exemplification a particular embodiment of the invention has been shown and described according to the best present understanding thereof. However, it will be apparent to those skilled in the art that various changes and modifications may be made in the construction and arrangement of the parts thereof without departing from the true spirit and scope of the invention.

What is claimed as new is as follows:

1. A fish hook guard for sheathing and shielding barbed hooks on a gang-type fish hook comprising a pear-shaped compressibly resilient rubber body embodying a bulbous-shaped body gradually decreased in cross-section at one end merging into an axial reduced neck, a plurality of circumferentially spaced radially disposed slots formed in said neck and body portions and communicating with one another at their inner edges and having their outer edges opening through the surfaces of the body and neck portions, all of said slots being linearly straight from end-to-end and restricted in size proportional with the portions of the barbed hooks which are adapted to be protectively fitted and frictionally lodged therein.

2. The structure defined in claim 1 and wherein corresponding ends of said slots terminate in spaced relation from an adjacent end of said body portion, the opposite ends of said slots opening through the tip of said neck portion.

3. The structure defined in claim 2 of a longitudinal axially disposed bore communicating with and extending through an end surface of said large end of the body portion and terminating intermediate the ends of said body portion.

References Cited in the file of this patent

UNITED STATES PATENTS

| | | |
|---|---|---|
| D. 167,803 | Miller | Sept. 23, 1952 |
| 2,095,048 | Aikins | Oct. 5, 1937 |
| 2,204,185 | Lougheed | June 11, 1940 |
| 2,616,209 | Ploen | Nov. 4, 1952 |